United States Patent Office 3,313,800
Patented Apr. 11, 1967

3,313,800
PRODUCT AND PROCESS FOR PREPARING DISPERSIBLE GUMS
Gerald James Jackson, Jr., Bardonia, and Irwin Samuel Butensky, Spring Valley, N.Y., assignors to American Cyanamid Company, Stamford, Conn., a corporation of Maine
No Drawing. Filed June 9, 1965, Ser. No. 462,741
4 Claims. (Cl. 260—209)

This invention relates to new slowly hydratable, readily dispersible galactomannans and particularly guar gum, and to methods of producing them.

Guar gum is a galactomannan with D-mannose units linked in a linear chain with a D-galactose molecule on approximately every second mannose unit. The molecular weight is of the order of 220,000. Guar gum has been used for the treatment of certain physiological disorders of the gastro-intestinal tract. Also it has been found effective in treatment of hypercholesteremia. The ordinary dose for humans for hyperchlosteremia is from 3 to 5 grams taken three to four times a day. When it is attempted to incorporate the guar gum into an aqueous medium, the gum hydrates so rapidly that the product soon sets to a semi-solid mass which is not palatable and which is not accepted by human patients. Suspensions of the gum in non-aqueous media such as glycerin have failed to provide a suitable dosage form, as they resulted in adherence of the gum to the oral or tracheal mucosa with subsequent discomfort and difficulty in swallowing and breathing.

It has also been proposed to encapsulate finely divided guar gum into gelatin capsules. This dosage form has the disadvantage of requiring the patient to swallow 4 or 5 large capsules at a time. However, a more important drawback is that when the capsules are swallowed the gastric juices dissolve the gelatin and begin to hydrate the outside of the gum contained therein, forming a hydrated shell, which acts as a barrier to further penetration and which results in imperfect use of the guar gum. The same problem is presented by tablets and, as a result, neither of these methods of incorporation have proven to be practical.

According to the present invention the properties of guar gum are modified to produce a product which disperses readily in aqueous media and while not completely unhydratable, hydration is so slow that when dispersed in aqueous media the dispersion remains fluid for a reasonable time, for example 15 to 45 minutes, which is quite adequate for oral use. The product is palatable and is readily accepted by patients.

The present invention solves the problem presented in guar gum therapy by modifying the gum with gelatin and formaldehyde in a special manner to produce rapidly and easily dispersible material which hydrates sufficiently slowly so that when dispersed in an aqueous medium it can be ingested without discomfort to a patient. The modified guar gums of the present invention will not resist hydration indefinitely, but instead of setting up in five minutes or so, dispersions in aqueous media remain sufficiently fluid for satisfactory use for longer periods, such as a half to three-quarters of an hour. This is an adequate time for practical use of the guar gum in therapy.

The modification of the gum requires its coprecipitations with gelatin from hydroalcoholic media. The modified gum is then dried, the water and alcohol being evaporated, and constitutes a product which disperses readily without the formation of large lumps and which when dispersed in aqueous medium remains at a usable viscosity for a reasonable time.

The amount of gelatin to be used is not particularly critical and, in general, ratios of gelatin to gum from 1:6 to 1:1 may be used. Larger proportions of gelatin are not practical and a 1:4 ratio has been found to be a desirable one and constitutes a preferred embodiment of the invention.

From the standpoint of process, the aqueous alcoholic solution must be sufficient to produce substantially a saturated solution of gelatin, but not a super-saturated solution and must be sufficient in volume to disperse the guar gum. Otherwise, premature precipitation of the gelatin results and the properties of the modified gum are adversely affected.

The particular alcohol to be used is not critical and any of the lower alkanols may be employed, such as methanol, ethanol, propanol or, as mentioned above, isopropanol. In general the hydro-alcoholic medium, which may advantageously be approximately equal parts of water and alcohol, will correspond to about twenty times the weight of the gelatin, which gives a saturated gelatin solution of sufficient volume to permit adequate dispersal of the guar gum. In such a case the amount of water present in the solution is approximately two and one-half times the weight of the guar gum. The exact amounts of water and alcohol are, of course, not critical but they must be in the range to produce a substantially saturated gelatin solution with sufficient volume to disperse the gum. Of course the exact amouns will vary with the ratio of gelatin to gum, and the approximately twenty times weight given above is a satisfactory amount to use with a gelatin to gum ratio of 1:4.

The gelatin may be initially dissolved in hot water and the alcohol then added, although this exact procedure is not an essential of the invention, all that is required being that there be produced a satisfactory solution of the gelatin and dispersion of the gum. After the gum has been added to the hydroalcoholic gelatin solution, which should still be warm, the mixture is cooled to room temperature and formaldehyde is added in alcoholic solution. The particular form of formaldehyde is not critical but ordinary formalin, which is a 37% aqueous solution of formaldehyde, is satisfactory. The alcohol-water ratio in the final mixture should be at least 1.5:1 for good results. After the formaldehyde-alcohol mixture is added, the gum precipitate with the gelatin is filtered off, dried and then ground. The drying is preferably from alcohol. If desired, prior to drying, a suitable physiologically acceptable wetting agent may be added in order to improve the dispersibility of the modified gum, although this is not essential; and the invention, therefore, includes products in which there is no wetting agent.

The particle size of the comminuted modified gum is also critical, an average particle size of approximately $150\mu$ being useful. If the gum is to be dispersed in water for administration, the product may be blended with suitable flavors and sweeteners to improve the palatability of the resulting product. The amount and particular flavors used are, of course, not vital and in general will be used in amounts to produce the desired flavoring and sweetness of the product.

Quantitative testing of the effect on the blood levels of cholesterol in chicks, which have been proven to be most acceptable laboratory animals, showed that the activity of the treated gums to be substantially undiminished as compared with untreated gums. The extent of human clinical use has not been sufficient to accumulate a sufficient number of thousands of tests to give sufficiently accurate numerical results, however, retention of activity of the slowly hydrating gums is indicated in humans.

The invention will be illustrated in connection with a typical example which is intended to be illustrative only

EXAMPLE 1

A purified, off-white guar gum flour of from 100 to 200 mesh and acid-treated gelatin derived from pork skin and having a bloom strength of 200 are used.

2 kg. of the gelatin were dissolved in 20 liters of water by stirring at 80–85° C. The temperature is then lowered to about 70° C. and an equal amount of isopropanol stirred in until a clear solution is obtained. 8 kg. of the guar gum flour described above is then added and the mixture is slowly cooled to 20–25° C. while keeping it thoroughly agitated. Then 405 cc. of a 37% aqueous formaldehyde solution with 30 liters isopropanol are added to the batch with vigorous stirring until a thick, homogeneous suspension is obtained. The solids were filtered off and 0.1 to 1% of a wetting agent, polyoxyethylene sorbitan monooleate in 20 liters of isopropanol was added at room temperature and stirred for twenty to thirty minutes followed by filtration.

The final residue was dried on trays in a circulating air oven for twenty-four hours at room temperature, then for another twenty-fours at 40° C., and finally for a third twenty-four hours at 60° C. The dried material was then comminuted to give a product of approximately 150μ particle size. The dried product was then blended with 0.12 kg. of lemon flavor and 0.2 kg. of sweetener, calcium cyclamate. 0.3 kg. of anhydrous citric acid was then added and the final product was then ready for use.

When the product was dispersed in water to form a 2% dispersion it retained its fluid consistency for from 30 to 45 minutes and was acceptably palatable to patients. The viscosity remained between 50 and 250 centipoises for the first 30 minutes.

EXAMPLE 2

The behavior of the product of Example 1 was compared to unmodified gum guar of the same particle size. When 4 gms. of this product were added to 250 ml. of water and stirred for a few minutes, the gum dispersed poorly, agglomerated, and formed a viscous gel within 5 minutes. It was quite unacceptable to patients in contradistinction to the palatable and acceptable dispersion of Example 1.

What is claimed is:

1. A process of modifying gum guar which comprises adding the gum to a hydroalcoholic solution of gelatin at moderately elevated temperatures, cooling the mixture while agitating, and adding an alcoholic solution of formaldehyde to the resultant mixture to precipitate the gelatin gum mixture, filtering and drying the precipitated material.

2. A process according to claim 1 in which the proportion of gelatin to gum guar is from 1:6 to 1:1.

3. A process according to claim 2 in which the proportion of gelatin to gum guar is approximately 1:4.

4. The product when prepared by the process of claim 1.

No references cited.

ELBERT L. ROBERTS, *Primary Examiner.*
JOHNNIE R. BROWN, *Assistant Examiner.*